United States Patent [19]
Miki et al.

[11] Patent Number: 5,646,758
[45] Date of Patent: Jul. 8, 1997

[54] OPTICAL TIME COMPRESSION MULTIPLEXING TRANSMISSION SYSTEM

[75] Inventors: Noriki Miki, Yokosuka; Kiyomi Kumozaki, Zushi, both of Japan

[73] Assignee: Nippon Telegraph and Telephone Corporation, Tokyo, Japan

[21] Appl. No.: 513,516

[22] Filed: Aug. 10, 1995

[30] Foreign Application Priority Data

Aug. 12, 1994 [JP] Japan .................................. 6-190743
Nov. 4, 1994 [JP] Japan .................................. 6-271481

[51] Int. Cl.⁶ .................................................. H04J 14/08
[52] U.S. Cl. .......................... 359/137; 359/167; 359/110; 370/521; 364/514 B
[58] Field of Search ................................ 359/135, 137, 359/157–158, 167, 194; 370/77, 94.3, 109, 100.1, 105.1, 105.4, 105.5, 282, 521; 364/514 B

[56] References Cited

U.S. PATENT DOCUMENTS 5,327,277  7/1994  Van Der Plas et al. ............... 359/137
5,341,365  8/1994  Clarke .................................. 359/135

FOREIGN PATENT DOCUMENTS 57-136831  8/1982  Japan .
1-137752   5/1989  Japan .

OTHER PUBLICATIONS

Fumio Mano et al., "A study on fast response AGC circuit for Passive Double Star optical subscriber systems", The Electronic Information Communication Society Meeting, B–602, pp. 4–62, 1991.

*Primary Examiner*—Kinfe-Michael Negash
*Attorney, Agent, or Firm*—Finnegan, Henderson, Farabow, Garrett & Dunner, L.L.P.

[57] ABSTRACT

The present invention provides an optical time compression multiplexing transmission system which suppresses the influence of optical reflection by a simple configuration without degrading transmission efficiency. The present invention is a 1:n (n being a natural number) time division multiplexing point-to-multi-point optical time compression multiplexing transmission system which comprises a decision element for determining whether or not the receiving signal which is outputted from a receiving element is a regular signal, an initialization element for initializing the operation condition of the receiving element when a receiving signal is determined to not be a regular signal by the decision element. When a signal is determined to not be a regular signal by the decision element, because the initialization element initializes the operation condition of the receiving element, the abnormal operation of the receiving element which is abnormal due to optical reflection which occurs by reflection can be returned to normal operation in a minimum amount of time.

15 Claims, 9 Drawing Sheets

Fr :FRAME PATTERN BIT
Oh:OVERHEAD BIT
Data:SENDING DATA
CRC:CRC INSPECTION BIT

OPTICAL TIME COMPRESSION MULTIPLEXING TRANSMISSION SYSTEM

BACKGROUND OF THE INVENTION

1. Field of the Invention

The present invention relates to an optical time compression multiplexing transmission system.

2. Background Art

Studies of various optical subscriber systems to realize FTTH (Fiber To the Home) are presently being conducted in every country.

As one of the systems to realize this FTTH, studies and developments of a passive double star (PDS) optical subscriber system are being conducted. In the PDS optical subscriber system, an optical star coupler, which is a passive optical device, is arranged at branch points on optical transmission lines. Then, time division bidirectional communication is carried out between equipment at a central office and more than one piece of equipment at subscriber premises.

In this system, time division bidirectional communication is generally realized in a single optical fiber by multiplexing downloaded optical signals from equipment at a central office to more than one piece of equipment at subscriber premises and uploaded optical signals from these pieces of equipment at subscriber premises to the equipment at a central office in time domain with TCM (Time Compression Multiplexing). Moreover, as a method of multiplexing optical signals to more than one piece of equipment at subscriber premises, a TDMA (Time Division Multiple Access) method which multiplexes these signals in the time domain is used.

In an optical transmission line, reflection occurs at parts, such as optical connectors and so on, which comprise a transmission line. Optical reflection occurs by returning a reflection to a transmission terminal at a time which is equivalent to a round trip delay time from the transmission terminal to where the optical signal was transmitted, to the reflection point, and back to the transmission terminal.

In bidirectional transmissions in a single optical fiber by the TCM-TDMA method, the following problems occur due to the optical reflection which degrade the receiving characteristics.

(Problem 1) Convergence on the optical reflection of an ACG (Automatic Gain Control) amplifier:

Generally, an optical receiving circuit of an optical transmission system is equipped with an automatic gain control amplifier to keep output amplitude at an appropriate level by controlling a degree of amplification according to the input level of received optical signals. Regardless of whether the received light is an optical reflection, the automatic gain control amplifier controls a degree of amplification according to the input level of the received light/optical signal.

Therefore, if the power of an optical reflection is high, and when using the gain which was controlled according to this optical reflection, the signal which should originally be received and follows the optical reflection cannot be sufficiently amplified. For example, when the electrical amplitude level of an optical reflection after changing the optical reflection into an electrical signal is greater than twice the electrical amplitude level of the receiving optical signal which follows the optical reflection, a problem of mistaking a signal which was originally "1" as the signal "0" occurs.

(Problem 2) The missynchronization of the optical reflection:

When a bit pattern which is identical with a frame pattern of a regular receiving optical signal exists in an optical reflection, frame synchronization will mistakenly be established by the optical reflection and the regular received optical signal which follows the optical reflection will probably not be received.

One of the solutions to the above-mentioned misconvergence of the automatic gain control amplifier is to set a guard time between sending and receiving optical signals to be sufficiently longer than the time constant of gain control of the automatic gain control amplifier. In this way, the gain of the automatic gain control amplifier can be made to converge during the guard time after the optical reflection passes.

However, the time constant of the gain control is set sufficiently long compared with the time width of a bit signal to prevent the gain from being changed by noise influence and/or "0"/"1" pattern effect of receiving signals. Therefore, it becomes necessary to set the length of the guard time to be very long so that the length of the guard time is set to be sufficiently longer than the time constant of the gain control. As a result, the time area for sending and receiving optical signals narrows and transmission efficiency decreases.

In addition, the above-mentioned guard time is a constant time which is provided to secure idle time which is necessary to change the operation condition between transmission and reception. This guard time is set respectively at both the central office and the subscriber premises. During this guard time, no optical signals are transmitted from either piece of equipment. That is, the output level from each piece of equipment during the guard time is continuously "0".

On the other hand, another measure to prevent the missynchronization with the optical reflection is to make the frame pattern length sufficiently long. This can lower the probability that a bit pattern in the optical reflection is identical with a frame pattern of a regular receiving optical signal. However, there is a problem in that the transmission efficiency decreases in this case too.

The following references show examples of the conventional art in automatic gain control amplifiers which are used by the subscriber systems. However, there are some problems in the conventional techniques described in these references. No consideration is given to the optical reflection whose occurrence cannot be controlled, or even if consideration is supposed to be given, the configuration is complicated or transmission efficiency has been decreased.

Conventional Art Reference 1) Fumio Mano, et al., "A study of fast-response AGC circuit for passive double star (PDS) optical subscriber systems", the electronic information communication society, Meeting, 1991, B-602.

Conventional Art Reference 2) Japanese Patent Application, First Publication, Sho 57-136831, "Receiving AGC control method."

Conventional Art Reference 3) Japanese Patent Application, First Publication, Hei 1-137752, "Receiving circuit."

SUMMARY OF THE INVENTION

The present invention is made in view of the above-mentioned problems. It is an object of the present invention to provide an optical time compression multiplexing transmission system which can reduce the influence of optical reflection by simple configuration without decreasing transmission efficiency.

The present invention is a time division multiplexing point-to-multi-point optical time compression multiplexing transmission system which provides time division multiplexing bidirectional 1:n transmission between equipment at a central office and n (n is natural number) sets of equipment at subscriber premises, connected to each other, through single optical fibers. Each equipment is comprised of the following:

a receiving means for receiving an optical signal and outputting a corresponding received signal, a decision means for deciding whether or not the received signal which was outputted from the receiving means is a regular signal, and an initialization means for initializing the operation condition of said receiving means when a received signal is determined to not be a regular signal by the decision means.

In operation according to the above configuration, after deciding whether or not the received signal is a regular signal by the decision means, the initialization means initializes the operation condition of the receiving means when the received signal is not a regular signal based on the decision result. Therefore, even if reflection exists in an optical transmission line, the operation condition of the receiving means, which has become irregular due to optical reflection can be initialized to a normal operation in a minimum time.

As a result, optical time compression multiplexing transmission with good efficiency can be realized.

BRIEF DESCRIPTION OF THE DRAWINGS

Further objects and advantages of the present invention will be apparent from the following description and the accompanying drawings wherein preferred embodiments of the present invention are clearly shown.

In the drawings.

DESCRIPTION OF THE PREFERRED EMBODIMENTS

Figure 1:
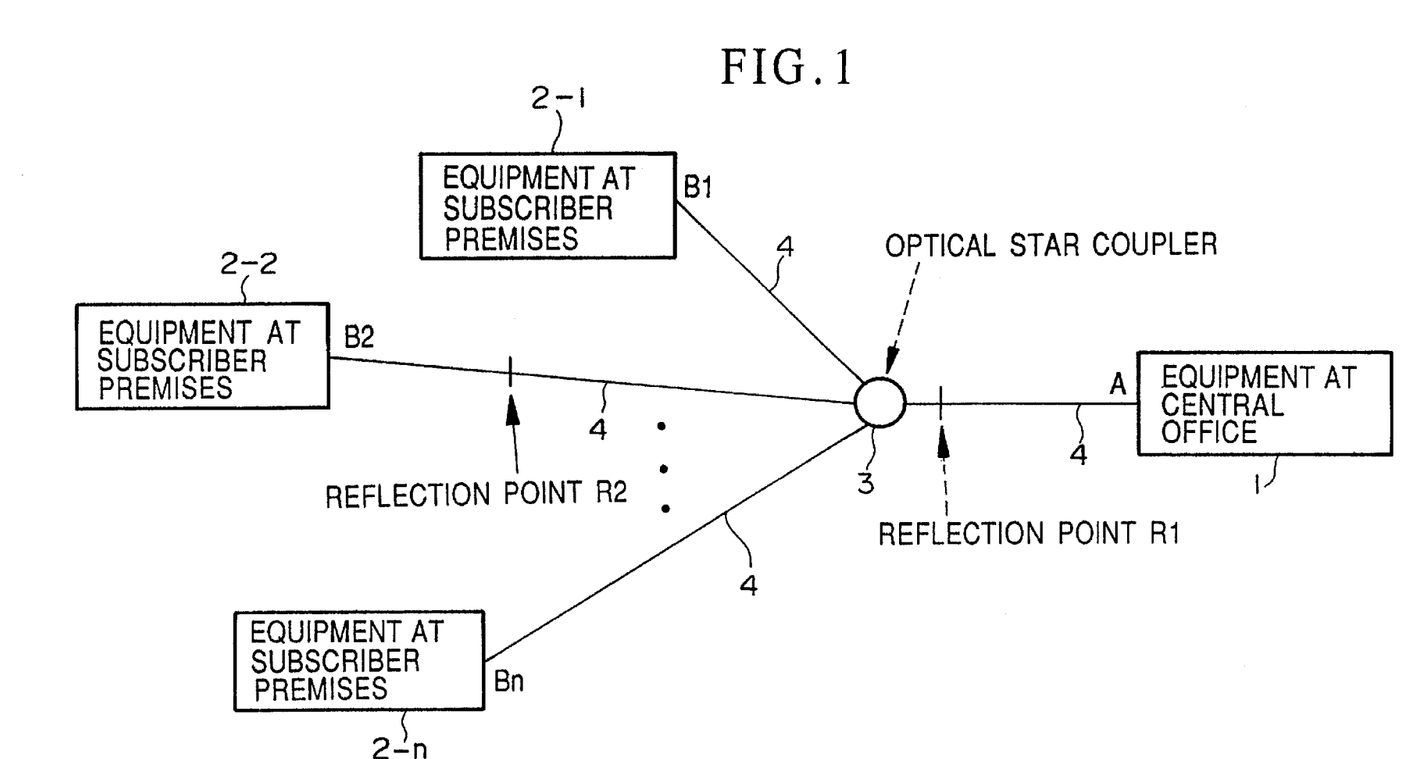
FIG. 1 is a block diagram which shows a configuration example of a point-to-multi-point optical time compression multiplexing transmission system including a star coupler which can be applied to the present invention.

FIG. 1 is a block diagram which shows one configuration example of a transmission system according to a point-to-multi-point optical time compression multiplexing transmission system to which the present invention can be applied. In the point-to-multi-point optical transmission system which is shown in this figure, transmitted downloaded optical signals from equipment at central office 1 is branched at optical star coupler 3 through transmission line 4 which consists of optical fiber, optical connectors, etc., and is transmitted to more than one piece of equipment at subscriber premises 2-1, 2-2, . . . , 2-n (n is a natural number) in broadcasting form through the transmission lines 4, 4, 4, . . . , which also consists of optical connectors, etc.

In addition, the above transmitted downloaded optical signals from equipment at central office 1 are time division multiplexing optical signals being multiplexed with each sending optical signal to more than one subscriber in a time domain. Each piece of equipment at subscriber premises 2-1, 2-2, . . . , 2-n chooses an optical signal for its own equipment from these downloaded optical signals, i.e., the time division multiplexing optical signals toward more than one subscriber, and receives it, respectively.

At the other end, in the uploaded transmission to the equipment at central office 1, each piece of equipment at subscriber premises 2-1, 2-2, . . . , 2-n transmits an uploaded optical signal in a time domain which is assigned to each piece of equipment at the subscriber premises. These uploaded optical signals from more than one piece of equipment at a subscriber premises 2-1, 2-2, . . . , 2-n join at the optical star coupler and are received by the equipment at a central office 1. In FIG. 1, A is the input/output terminal of the equipment at central office 1 and B1, B2, . . . , Bn are input/output terminals at each piece of equipment at subscriber premises 2-1, 2-2, . . . , 2-n.

Next, referring to FIG. 2, one preferred embodiment of the internal configuration of the equipment at central office 1 and each piece of equipment at subscriber premises 2-1, 2-2, . . . , 2-n which are shown in FIG. 1 will be explained. Because the internal configuration of each piece of equipment at subscriber premises 2-1, 2-2, . . . , 2-n can be identical, the internal configuration of equipment at subscriber premises 2-n is shown in this figure as a representative example. Furthermore, identical reference signs are used for each component whose basic configuration is identical at both the equipment at central office 1 and the equipment at subscriber premises 2-n.

Figure 2:
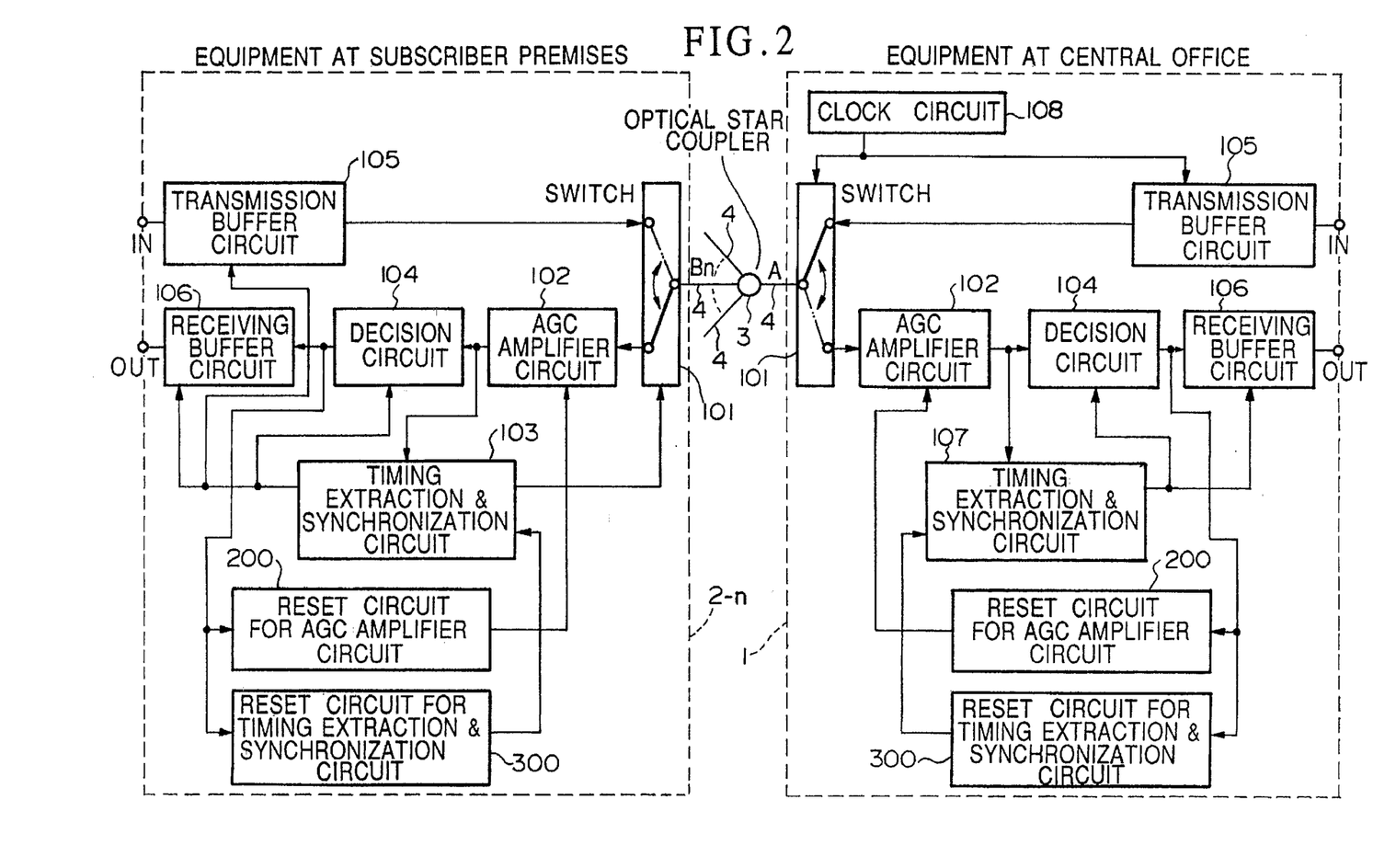
FIG. 2 is a block diagram which shows a configuration of a point-to-multi-point time division multiplexing optical time compression multiplexing transmission system which is an embodiment of the present invention.

The equipment at central office 1 shown in FIG. 2 is comprised of the following circuits and devices:

a clock circuit 108 which generates a clock signal;

a switch 101 which switches between transmission and receiving modes according to the clock from the clock circuit 108;

an AGC (automatic gain control) amplifier circuit 102 which changes a received optical signal outputted from the switch 101 into an electric signal, amplifies it while adjusting a degree of amplification in order to keep its output amplitude level at an appropriate level, and outputs the amplified receiving signal (in addition, the automatic gain control amplifier 102 may be modified in order that it amplifies a received optical signal before changing it into an electrical signal while adjusting the gain, and after that, changes the amplified optical signal into an electric signal);

a timing extraction and frame synchronization circuit 107 which performs timing extraction and frame synchronization based on the output signal of the automatic gain control amplifier 102;

a decision circuit 104 which distinguishes "0"/"1" of the received signal based on the output of automatic gain control amplifier 102;

a receiving buffer circuit 106 which stores burst data which is outputted from the decision circuit 104, and outputs the data at an original data speed;

a transmission buffer circuit 105 which outputs optical signals as burst data according to the clock from the clock circuit 108 after storing inputted transmission data from an input terminal and changing it into optical signals;

a reset circuit 200 for the automatic gain control amplifier 102 which resets the gain of the automatic gain control amplifier 102 based on the output from the decision circuit 104; and a reset circuit 300 for the timing extraction and frame synchronization circuit 107 which resets the synchronous condition of the timing extraction and frame synchronization circuit 107 based on the output from the decision circuit 104.

Incidentally, plural signal lines are laid down among each of the blocks in the above-mentioned configuration but are not illustrated, and outputs of the clock circuit 108, the timing extraction and frame synchronization circuit 107 and so on are transferred among each of the blocks through them.

The equipment at subscriber premises 2-n includes the switch 101, the automatic gain control amplifier 102, the timing extraction and frame synchronization circuit 103, the decision circuit 104, the receiving buffer circuit 106, the transmission buffer circuit 105, the reset circuit 200 and the reset circuit 300, approximately in the same way as the equipment at central office 1.

The main differences between the equipment at subscriber premises 2-n and the equipment at central office 1 are that equipment at subscriber premises 2-n does not contain clock circuit 108, that the switch 101 of the equipment at subscriber premises 2-n is switched according to the output of the timing extraction and frame synchronization circuit 103, and that the timing extraction and frame synchronization circuit 103 in the equipment at subscriber premises 2-n is additionally equipped with a function for extracting a signal for the subscriber's equipment from the signals for all equipment arriving at the subscriber premises.

The equipment at central office 1 and the equipment at subscriber premises 2-n carry out optical time compression multiplexing transmission while they are connected to each other through the optical transmission lines 4, 4, 4, . . . , the optical star coupler 3, and the respective switch 101, alternately according to both receiving and transmission modes.

The most characteristic portions of the present invention in the above configuration are the reset circuit 200 for the automatic gain control amplifier 102 and the reset circuit 300 for the timing extraction and frame synchronization circuit 103 or 107 which are provided for the equipment at central office 1 and the equipment at subscriber premises 2-n, respectively. The reset circuit 200 is a circuit which is provided to prevent the automatic gain control amplifier from converging with the optical reflection. The reset circuit 300 is a circuit which is provided to prevent missynchronization with the optical reflection. These circuits can operate independently. Therefore, these circuits may be equipped in both the equipment at central office 1 and the equipment at subscriber premises 2-n, as shown in FIG. 2, or they may be provided in one or the other equipment.

The basic operation of the optical time compression multiplexing transmission system, which is shown in FIG. 2, will be explained before the details of reset circuit 200 and reset circuit 300 are explained.

Figure 3:
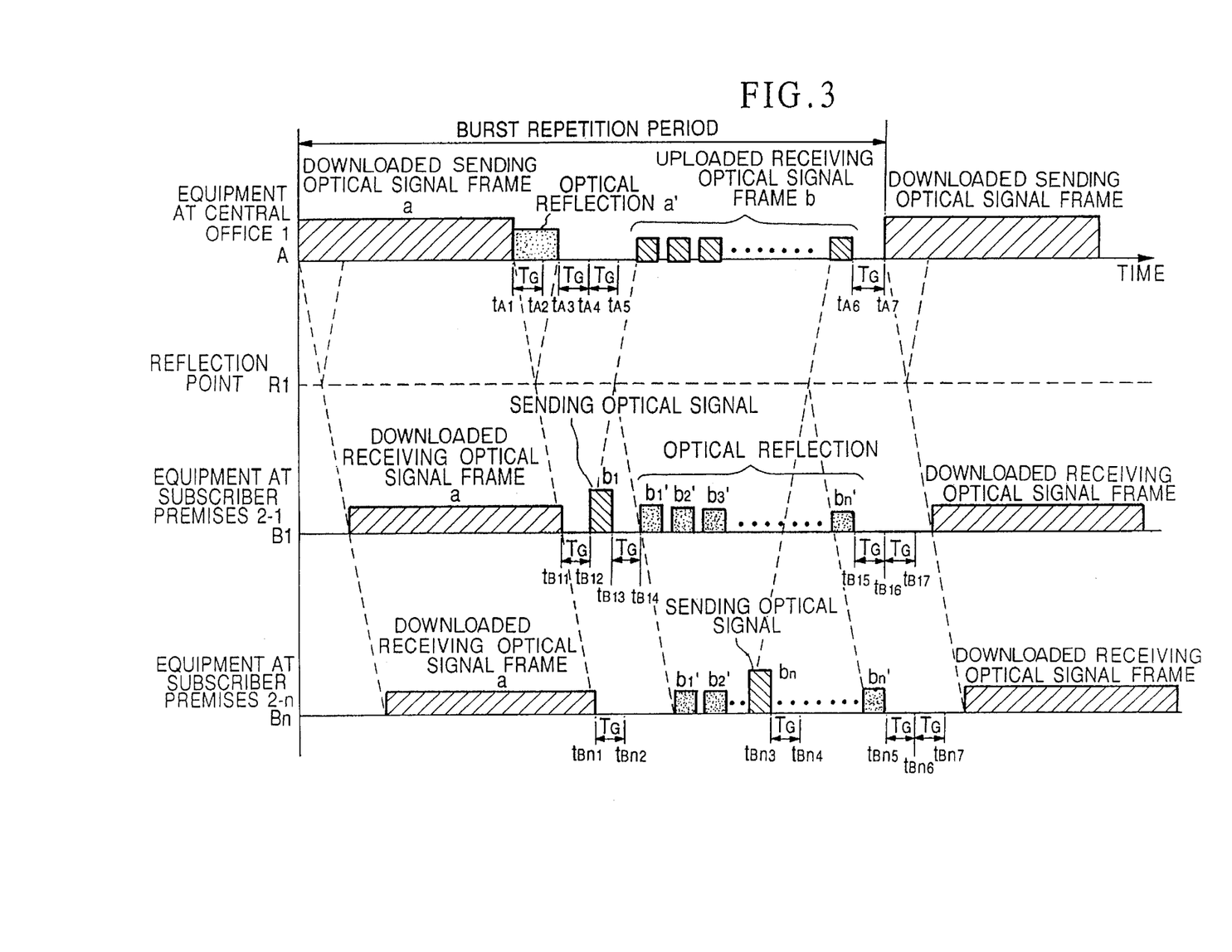
FIG. 3 is a sending and receiving diagram of the point-to-multi-point time division multiplexing optical time compression multiplexing transmission system which is shown in FIG. 2.

FIG. 3 is a timing diagram which shows an example of the sending and receiving operation of a point-to-multi-point optical time compression multiplexing transmission system which has been explained referring to FIG. 1 and FIG. 2. FIG. 3 is a diagram with the assumption that there is a reflection point R1 between the equipment at central office 1 and optical star coupler 3, which is shown in FIG. 1. This figure also shows the temporal change of the optical signals at the input/output terminal A of the equipment at central office 1 and the input/output terminals B1, . . . , Bn of each piece of equipment at subscriber premises 2-1, . . . , 2-n.

By changing sending and receiving alternately at each burst repetition period in the system which is shown in FIG. 1, signals are exchanged among the equipment at central office 1 and each piece of equipment at subscriber premises 2-1, 2-2, . . . , 2-n. Optical signals sent to each piece of equipment at subscribed premises 2-1, 2-2, . . . , 2-n are transmitted as downloaded sending optical signals every burst repetition period from the equipment at central office 1.

In this case, sending optical signals to each piece of equipment at subscriber premises 2-1, 2-2, . . . , 2-n are multiplexed by a time division multiplexing method within this downloaded sending optical signal frame "a" (input/output terminal A). These downloaded sending optical signals are received as downloaded receiving optical signals at each piece of equipment at the subscriber premises (input/output terminal B1, . . . , Bn). Each piece of equipment at the subscriber premises chooses a signal for its equipment out of plural signals contained in the downloaded receiving optical signals.

In the uploading direction, each piece of equipment at the subscriber premises transmits uploaded sending optical signals b1, b2, . . . , bn, respectively, in the time period which is respectively allocated for each piece of equipment (input/output terminal B1, . . . , Bn). These uploaded sending optical signals b1, b2, . . . , bn are received in uploaded receiving optical signal frame b by the equipment at central office 1 (input/output terminal A).

Each transmission time of the uploaded sending optical signals b1, b2, . . . , bn is assigned by control of the equipment at central office 1 to each piece of equipment at the subscriber premises, so that the uploaded optical signals of each piece of equipment at the subscriber premises do not interfere with each other.

Also, a guard time $T_G$ is secured in both changing to receiving from sending, and in changing to sending from receiving, at the equipment at central office 1 and at each subscriber equipment. That is, at the equipment at central office 1, the switch 101 is switched from the side of sending to the side of receiving at time $t_{A\,2}$ after the $T_G$ period from time $t_{A\,1}$ when finishing transmitting the frame "a" of the downloaded sending optical signals, and in this condition, it can receive signals. Then, the switch 101 is again switched at time $t_{A\,7}$ after the $T_G$ period from time $t_{A\,6}$ when finishing receiving the sending optical signal bn which places the end of the frame b of the uploaded receiving optical signals, and the condition returns to the sending one in which it can send signals again.

On the other hand, in each piece of equipment at subscriber premises 2-1, . . . , 2-n, each switch 101 is switched from the receiving side to the sending side after the $T_G$ period (at time $t_{B\,1\,2}, \ldots, t_{B\,n\,2}$) from the rearmost part (at time $t_{B\,1\,1}, \ldots, t_{B\,n\,1}$) of the frame "a" of the downloaded receiving optical signals, and the operation condition becomes a sending one. Then, the changing of the opposite direction from the condition for sending to the other condition for receiving is carried out after the $T_G$ period from the respective finishing time of sending one of the subscriber's sending optical signals b1, . . . , bn at each piece of equipment at subscriber premises 2-1, . . . , 2-n.

Therefore, switching the switch 101 from the side of sending to the side of receiving at each piece of equipment at subscriber premises 2-1, . . . , 2-n depends on the assignment position of each sending optical signal in the frame b of the uploaded sending optical signals. For example, when assigned to the forefront b1 (at the input/output terminal B1), switching is carried out at time $t_{B\,1\,4}$ after the $T_G$ period from time $t_{B\,1\,3}$ when finishing sending the sending optical signal b1. For example, when assigned to the rearmost part bn (at the input/output terminal Bn), switching is carried out at time $t_{B\,n\,4}$ after the $T_G$ period from time $t_{B\,n\,3}$ finishing sending the sending optical signal bn.

Next, the optical reflection which occurs at reflection point R1 will be explained. Downloaded sending optical signal frame "a" which has been sent from the equipment at central office 1 is reflected at the reflection point R1 and returns to the equipment at central office 1 as an optical reflection a'. During the period which is equivalent to the round trip delay time between the input/output terminal A and the reflection point R1 from time $t_{A\,1}$ when the rearmost of the downloaded optical sending signal frame "a" was sent from the input/output terminal A, the optical reflection a' is observed continuously at central office 1 (during time $t_{A\,1}$–$t_{A\,3}$).

On the other hand, at each input/output terminal B1, . . . , Bn of each piece of equipment at subscriber premises 2-1, . . . , 2-n, the optical reflection b1', b2', . . . , bn' corresponding to the respective uploaded sending optical signals b1, b2, . . . , bn from one of the subscriber's equipment or another subscriber's equipment is observed in the time which is equivalent to the round trip delay time between each of input/output terminals B1, B2, . . . , Bn and the reflection point R1.

Next, the details of the reset circuit 200 for the automatic gain control amplifier 102 will be explained.

The reset circuit 200, which is shown in FIG. 2, watches the output signal of the decision circuit 104. It outputs a reset signal to the automatic gain control amplifier 102 if the duration of continuous "0" level of the output signals from the decision circuit 104 is equal to or greater than a predetermined time period. For example, this reset circuit 200 may be realized simply by some logic circuits which count continuous "0" level signals. The above-mentioned predetermined time, which is used as a standard for the decision of the reset circuit 200 whether to output a reset signal, may be optionally set. However, it is desirable to set the time as being exactly or approximately equal to the guard time $T_G$. Moreover, the automatic gain control amplifier 102 resets an amplification gain to a maximum level when this reset signal is inputted.

Next, referring to FIG. 3, it will be explained how the reset circuit 200 for the automatic gain control amplifier 102 operates.

As explained above referring to FIG. 3, the operation condition of the equipment at central office 1 is changed to the receiving condition from the sending condition at time $t_{A\,2}$ when the guard time $T_G$ passed after sending-out the sending frame "a". In the case shown in FIG. 3, the optical reflection a' of the sending frame "a" which was caused by the reflection point R1 on the transmission line 4 exists at the input/output terminal A of the equipment at central office 1 at time $t_{A\,2}$. Therefore, the gain of the automatic gain control amplifier 102 which received this optical reflection a' is automatically adjusted based on the level of the optical reflection a' and the gain is kept low. The optical reflection a' disappears at time $t_{A\,3}$ and the output signal of the decision circuit 104 becomes "0".

Because the reset circuit 200 is watching the output signal of the decision circuit 104 at this time, when the duration of the continuous "0" level condition becomes approximately equivalent to the guard time $T_G$ (at time $t_{A\,4}$), it outputs the first reset signal. The automatic gain control amplifier 102 is forced to be reset by this reset signal and the gain is set to the maximum level. Because the automatic gain control amplifier 102 amplifies the input signals at the maximum gain, even if the signal in the beginning of the following receiving frame b which is sent from each piece of equipment at the subscriber premises 2-1, 2-2, . . . , 2-n and attenuated to a low level, the signal can be normally received without error in detection.

The reset signal which is generated by the reset circuit 200 is repeatedly generated every time the duration of continuous "0" level approximately passes another guard time $T_G$. In the example shown in FIG. 3, a reset signal is generated again at time $t_{A\,5}$ when the guard time $T_G$ elapsed from time $t_{A\,4}$ when the first reset signal was generated.

Incidentally, in the case of always setting the reset circuit 200 at the operation condition, if the "0" continuation signal which is longer than the guard time $T_G$ is contained in the frame b of the receiving signal, i.e. the uploaded receiving optical signal, the automatic gain control amplifier 102 is reset by mistake with a regular signal. To prevent this, after a frame synchronization is established, the reset circuit 200 should be set so as not to operate during the receiving frame area. The reset circuit 200 is set so that it is always possible to operate in the condition of proving in frame synchronization wherein the synchronization of the receiving frame b is not established, that is, it may be set to start operating at the rearmost part of the sending frame after synchronization is established, and to stop the operation at the beginning of the receiving frame.

On the other hand, the reset circuit 200 becomes set to operation conditions at time $t_{B\,14}$ at which each piece of equipment at subscriber premises 2-1, 2-2, . . . , 2-n operates basically like the case of the above-mentioned equipment at central office 1. For example, at the equipment at subscriber premises 2-1, the switch 101 is switched at time $t_{B\,1\,4}$ after the guard time $T_G$ period from time $t_{B\,1\,3}$ when it has completed sending the sending optical signal b1 in the uploaded sending optical signal frame b. In this case, because the automatic gain control amplifier 102 becomes set to operation condition at time $t_{B\,1\,4}$ at which it can receive signals, after that, the gain of the automatic gain control amplifier 102 is controlled according to the sending optical signals or optical reflection b1', b2', . . . , bn' caused by one of the subscriber's equipment, or coming from another equipment at the subscriber premises which are transmitted on the transmission line 4.

The reset circuit 200 in the equipment at subscriber premises 2-1 outputs a reset signal at time $t_{B\ 1\ 6}$ after the guard time $T_G$ from time $t_{B\ 1\ 5}$ when the optical reflection bn' is not observed at the input/output terminal B1. Therefore, at this time, the gain of the automatic gain control amplifier 102 is reset to the maximum, and the beginning of the downloaded receiving optical signal in the following burst repetition period is received with an appropriate gain.

In addition, for example, in the equipment at subscriber premises 2-n, the switch 101 is switched at time $t_{B\ n\ 4}$ after the guard time $T_G$ from time $t_{B\ n\ 3}$ when it has finished sending the sending optical signal bn in the uploaded sending optical signal frame b. In this case, because the automatic gain control amplifier 102 is in the condition at which it can receive signals at time $t_{B\ n\ 4}$, after that, the gain of the automatic gain control amplifier 102 is controlled according to the sending optical signals and the optical reflection from a subscriber's equipment and other equipment at the subscriber premises on the transmission line 4.

The reset circuit 200 of the equipment at subscriber premises 2-n outputs a reset signal at time $t_{B\ n\ 6}$ after the guard time $T_G$ from time $t_{B\ n\ 5}$ when the optical reflection bn' corresponding to the sending optical signal bn from the same equipment had not been observed at the input/output terminal Bn. Therefore, at this time, the gain of the automatic gain control amplifier 102 is reset in the maximum, and the beginning of the downloaded receiving optical signal of the following burst repetition period is received at an appropriate gain.

Although the timing when the reset circuit 200 for the automatic gain control amplifier outputs a reset signal differs depending upon the assigned position of the sending optical signal in the equipment at subscriber premises 2-1, there should be no difference in the problem of the misconvergence of the gain of the automatic gain control amplifier 102 to the optical reflection being solved before the following burst repetition period begins. Incidentally, when an optical reflection of a frame is not received for a long period, because the period of the continuous "0" level also becomes long, plural reset signals are repeatedly outputted at the cycle of $T_G$ (at times $t_{B\ 1\ 7}$, $t_{B\ n\ 7}$) until the next receiving optical signal is received.

Figure 4:
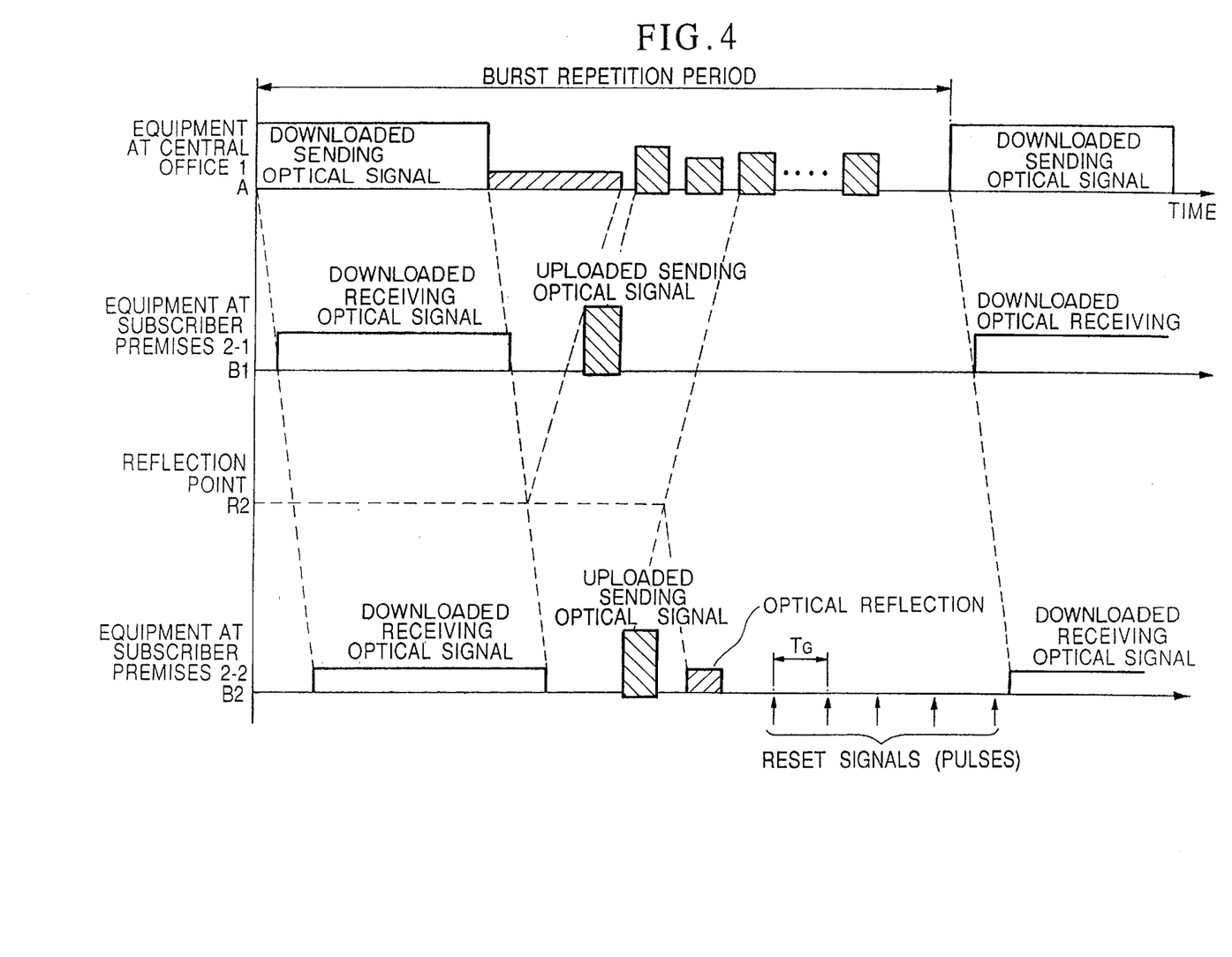
FIG. 4 is another sending and receiving diagram of a different condition from FIG. 3 in the point-to-multi-point the time division multiplexing optical time compression multiplexing transmission system which is shown in FIG. 2.

Next, referring to FIG. 4, it will be explained how the reset circuit 200 for the automatic gain control amplifier 102 operates when there is another reflection point R2 between the optical star coupler 3 and the equipment at subscriber premises 2-2, which is shown in FIG. 1.

However, in this case, it should be possible to ignore a reflection at the reflection point R1 which is shown in FIG. 1. In this condition, in the equipment at central office 1, the round trip delay time from the input/output terminal A to the reflection point R2 becomes longer compared with the case shown in FIG. 3, and the duration of the optical reflection of the downloaded sending optical signals becomes long. Therefore, in some cases, the period of continuous "0" until the beginning of the uploaded receiving optical signals after the optical reflection disappears becomes short as shown in FIG. 4, and the reset circuit 200 might sometimes generate no reset signal.

However, in this case, the attenuation of the optical reflection which occurs between the input/output terminal A and the reflection point R2 becomes large as well as the duration becomes long because an optical star coupler is contained in the route of the optical reflection. Because the signal level of the optical reflection becomes sufficiently lower than the uploaded receiving optical signal and the automatic gain control amplifier 102 can follow the uploaded receiving optical signal of the following without delay, even if having converged on the optical reflection, the influence of the optical reflection on the automatic gain control amplifier 102 can be ignored.

On the other hand, the power of the optical reflection corresponding to the sending optical signal from one piece of subscriber's equipment, which occurs at the reflection point R2, becomes large at the input/output terminal B2 of the equipment at subscriber premises 2-2. However, at least once until the beginning of the following burst repetition period after receiving this optical reflection, the reset circuit 200 of equipment at subscriber premises 2-2 outputs a reset signal to the automatic gain control amplifier 102. Therefore, the misconvergence of the automatic gain control amplifier 102 to the optical reflection never exerts a deleterious influence on the receiving of the downloaded receiving optical signals in the following burst repetition period.

Incidentally, various well-known circuits can be used as the above-mentioned automatic gain control amplifier 102 which can be reset by the reset circuit 200. Here, with reference to FIG. 11, one example of the automatic gain control amplifier 102 whose gain can be reset will be explained. The automatic gain control amplifier 102 shown in this figure consists of an operational amplifier, a fixed resistance as a negative feedback resistance, a FET as an input resistance, a condenser, a diode, a direct current bias power supply, and a transistor which is connected to the condenser and so on. At the gate of this FET being connected to the condenser, the charging and discharging of the electric charge to this condenser are controlled according to the signal at the output terminal of the operational amplifier. The transistor which is connected to the condenser is provided for discharging the electric charge of this condenser and it operates according to the reset signal from the reset circuit 200.

Figure 11:
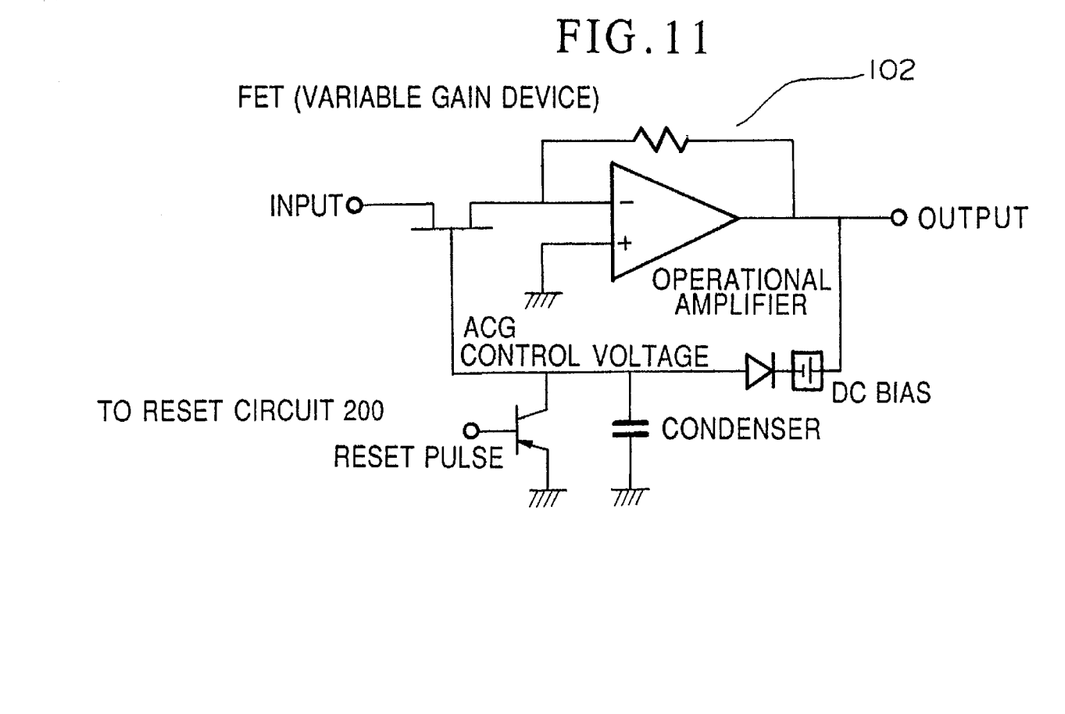
FIG. 11 is a schematic diagram which shows one configuration example of the automatic gain control amplifier 102 which is shown in FIG. 2.

By controlling the electric charge to charge the condenser with a feedback control method according to the output of the operational amplifier by such configuration, the resistance value between drain-source of the FET is changed to adjust the gain of the operational amplifier, and the amplitude of the output signal can be kept at a fixed value. The resistance value of the FET is made to be large by discharging the electric charge of the condenser, and the gain of the operational amplifier is set at a given maximum value immediately after a reset signal is sent from the reset circuit 200 to the automatic gain control amplifier 102.

When using the configuration of this example, the automatic gain control amplifier 102 can be made to reset at maximum gain with only the addition of some simple circuit parts.

Next, the details of the reset circuit 300 for the timing extraction and frame synchronization circuit 103 or 107 will be explained.

As mentioned above, in the time area of the sending frame, each switch 101 in each piece of equipment is switched to the side of the sending in the equipment at central office 1 and each piece of equipment at subscriber premises 2-1, 2-2, ..., 2-n which are shown in FIG. 1 and FIG. 2. Therefore, an optical signal from a subscriber's equipment is never directly inputted to each automatic gain control amplifier 102.

After the sending frame is sent out, each switch 101 is switched to the side of receiving, and each piece of equipment changes to be in a condition in which it can receive signals. When an optical reflection is received in this condition, the automatic gain control amplifier 102 controls its gain according to the amplitude level of the optical reflection and keeps the output amplitude at an appropriate level.

The timing extraction and frame synchronization circuit 107 or 103 operates to establish synchronization according to the output of this automatic gain control amplifier 102 in the equipment at central office 1 or in each piece of equipment at subscriber premises 2-1, 2-2, . . . , 2-n. If a bit pattern which is identical to the frame pattern of the regular receiving optical signal exists in the optical reflection at this time, the frame pattern of the regular receiving optical signal which follows goes undetected because the timing extraction and frame synchronization circuit 107 or 103 has established the frame synchronization of the optical reflection.

Also, in this case, it is difficult to estimate the distance from each piece of equipment at a subscriber premises to the equipment at the central office and/or the reflection position in the transmission line beforehand. Therefore, it is not easy to set some limitation to the timing of the frame synchronization establishment beforehand to prevent it from influencing an optical reflection and to receive only a regular receiving frame.

When a bit pattern which is identical with the frame pattern of the regular receiving optical signals exists in the optical reflection, a probability is determined according to the number of bits in the frame pattern. For example, there is possibility that synchronization is incorrectly established for the optical reflection at a probability of $\frac{1}{2^8}$ with a given received optional bit line of 8 bits if the frame pattern is 8-bit. However, according to the present invention, even if the timing extraction and frame synchronization circuit 107 or 103 established synchronization of the frame pattern in an optical reflection which is not regular, because the reset circuit 300 watches over the output of the decision circuit 104 and determines whether or not the receiving signal is a regular signal, and when the receiving signal is determined to not be a regular signal, it operates to reset the timing extraction and frame synchronization circuit 103. Therefore, the probability that the frame pattern of the following regular receiving optical signals goes undetected can be made small.

Figure 5:
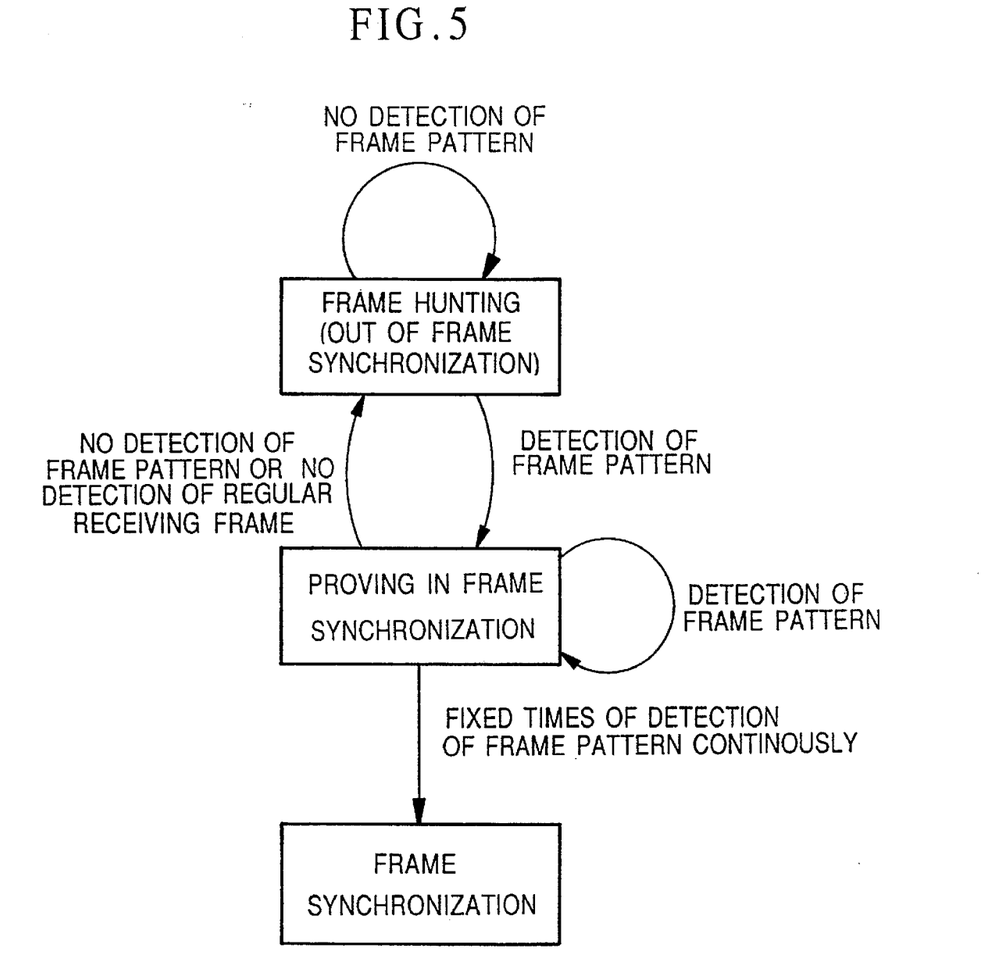
FIG. 5 is a condition transition diagram which shows condition transition in the process of a frame synchronization establishment with the embodiment which is shown in FIG. 2.

Here, with reference to FIG. 5, the condition transition of the point-to-multi-point of optical time compression multiplexing transmission system which is shown in FIG. 2 during the process of the frame synchronization establishment will be explained. The transition is made for verification of the frame synchronization condition when detecting a frame pattern in the frame hunting condition (in a condition of missynchronization) as shown in this figure. In the case in which a frame pattern is not detected at an anticipated frame pattern position of the following frame in the proving in frame synchronization condition or in the case in which a frame pattern is determined to not be a regular receiving frame in spite of detecting a frame pattern, the reset circuit 300 resets the timing extraction and frame synchronization circuit 103 and returns to the frame hunting condition. Furthermore, the transition transfers to the synchronous condition when detecting frame patterns of a fixed constant number continuously at the frame pattern position of the following frame when verifying the frame synchronization condition.

Figure 6:
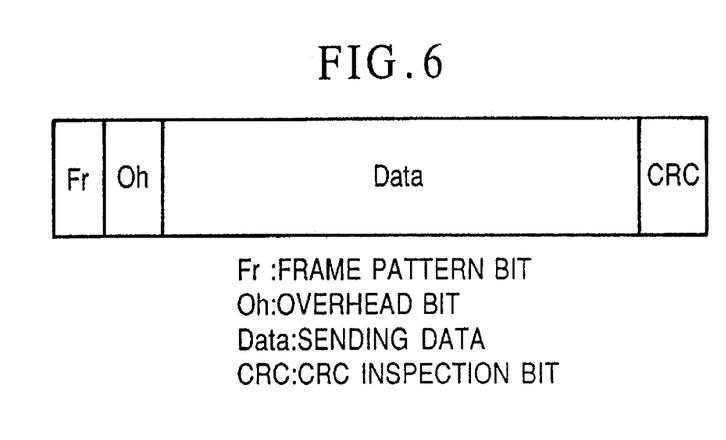
FIG. 6 is a schematic diagram which shows the one configuration example of a transmission frame which can be used for the point-to-multi-point time division multiplexing optical time compression multiplexing transmission system which is shown in FIG. 2.

FIG. 6 is a schematic diagram which shows an example of a sending frame which is used in the point-to-multi-point optical time compression multiplexing transmission system which is shown in FIG. 2. The sending frame which is shown in this figure is comprised of a frame pattern bit Fr used for frame synchronization, an overhead bit Oh to transmit maintenance information, sending data (Data) which consists of communication signals, and CRC (Cyclic Redundancy Check) inspection bit CRC for detecting faults. In this embodiment, the overhead bit Oh or the cyclic redundancy check inspection bit CRC which are shown in FIG. 6 are used as supplementary information for the frame synchronization in the process of the frame synchronization establishment.

Figure 7:
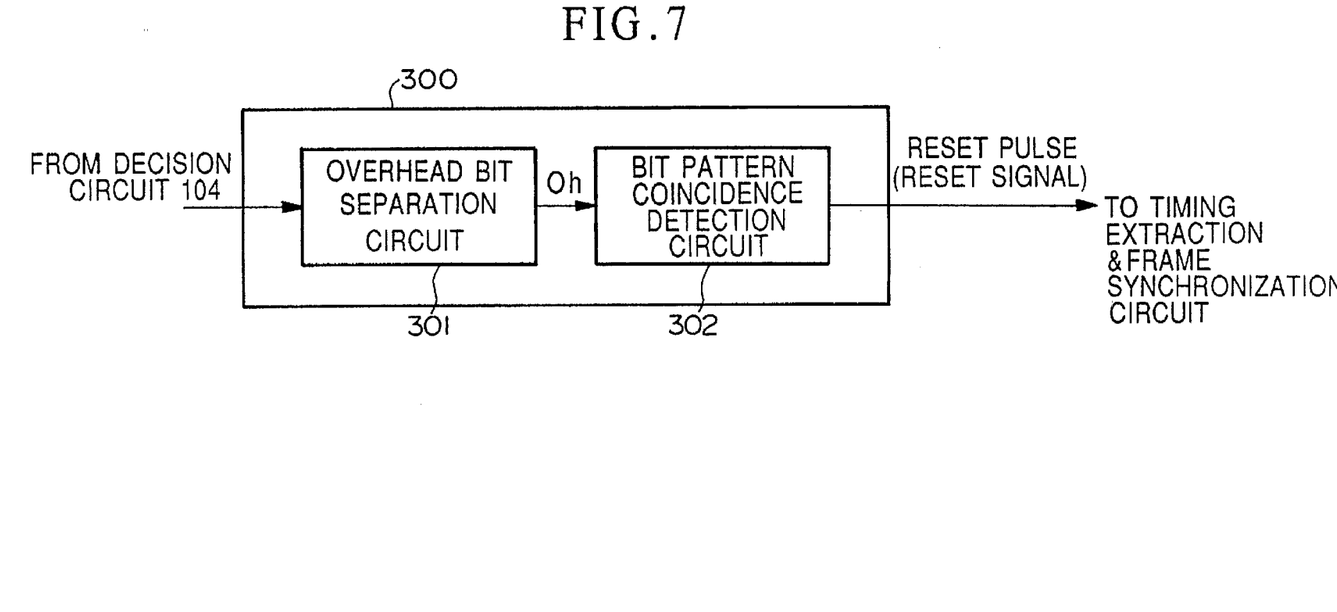
FIG. 7 is a block diagram which shows an example of an internal configuration of the reset circuit 300 for the timing extraction and frame synchronization circuit which is shown in FIG. 2.

FIG. 7 is a block diagram which shows a configuration example of the reset circuit 300 which is shown in the FIG. 2 when it uses the overhead bit Oh which is shown in FIG. 6 as the supplementary information for the frame synchronization. The receiving signal from the decision circuit 104 which is shown in FIG. 2 is inputted to an overhead bit separation circuit 301 which is shown in FIG. 7, and then the overhead bit Oh is separated from the receiving signal. Then, bit pattern coincidence detection circuit 302 checks for a match between the overhead bit Oh and a predetermined bit pattern, and if a discrepancy is detected, it sends out a reset pulse to the timing extraction and frame synchronization circuit 103.

In the process of the frame synchronization establishment, because some fixed bit pattern is generally sent out as the overhead bit Oh, that bit pattern is set at the pattern coincidence detection circuit 302 beforehand. Even if a bit pattern which is identical with the frame pattern bit Fr of the sending frame pattern exists in the optical reflection, the probability that the following bit pattern in the optical reflection is in conformity with the fixed bit pattern of the regular overhead bit Oh is extremely low.

Therefore, according to the configuration which is shown in this figure, even if a bit pattern which is identical with frame pattern bit Fr is detected in the optical reflection, the reset circuit 300 detects, in most of the cases, that the bit pattern which follows the frame pattern bit Fr is not identical to the regular overhead bit Oh. Therefore, a reset pulse is sent out to the timing extraction and frame synchronization circuit 103. When a reset pulse is inputted, the timing extraction and frame synchronization circuit 103 enters the out of frame synchronization condition, and begins processing for establishing synchronization of the following receiving signal.

According to the configuration of FIG. 7, in this way, even if a bit pattern which is identical with the frame pattern bit Fr exists in the optical reflection, the probability of missynchronizing the bit pattern in the optical reflection while continuously receiving incorrect receiving data is minimal, and the transmission efficiency can thereby be improved. This configuration can also reduce time loss due to missynchronization because the reset circuit 300 determines whether or not the frame pattern bit Fr is regular based on the overhead bit Oh which follows the frame pattern bit Fr, and a regular synchronization can be established with the next frame pattern bit Fr without delay.

Even if the timing extraction and frame synchronization circuit 103 or 107 detects a bit pattern which is identical with the regular frame pattern bit Fr in the optical reflection, the synchronous establishment never continues in this condition because it synchronizes with that bit pattern according to the above-mentioned embodiment in the above-mentioned way. Therefore, only the original receiving signal which follows the frame pattern bit Fr and the overhead bit Oh according to a regular sending frame can be normally received with a higher probability.

Figure 8:
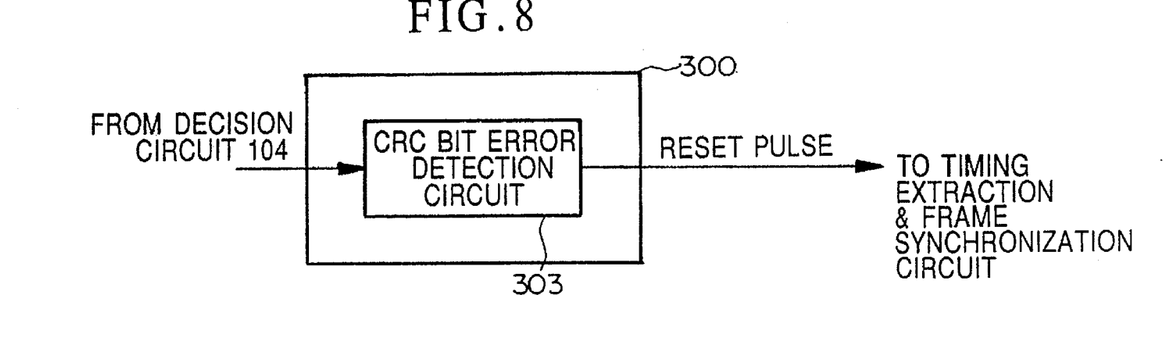
FIG. 8 is a block diagram which shows another configuration example of the reset circuit 300 for the timing extraction and frame synchronization circuit which is shown in FIG. 2.

FIG. 8 is a block diagram which shows a configuration example of the reset circuit 300 when using the CRC inspection bit CRC which is shown in FIG. 6 as supplementary information for the frame synchronization. A receiving signal from the decision circuit 104 is inputted to a CRC error detection circuit 303. The CRC error detection circuit 303 sends out a reset pulse to the timing extraction and frame synchronization circuit 103 when a CRC error is detected. Even if a bit pattern which is identical with the frame pattern Fr exists in the optical reflection, because the probability that the corresponding CRC inspection bit exists is very low, it is determined that there is an error as a result of the error detection in most of the cases and the timing extraction and frame synchronization circuit 103 is reset by a reset pulse. Therefore, it is possible to almost certainly avoid continuing missynchronization conditions. It is also possible that the reset circuit 300 uses both of the overhead bit Oh and the CRC inspection bit CRC.

Figure 9:
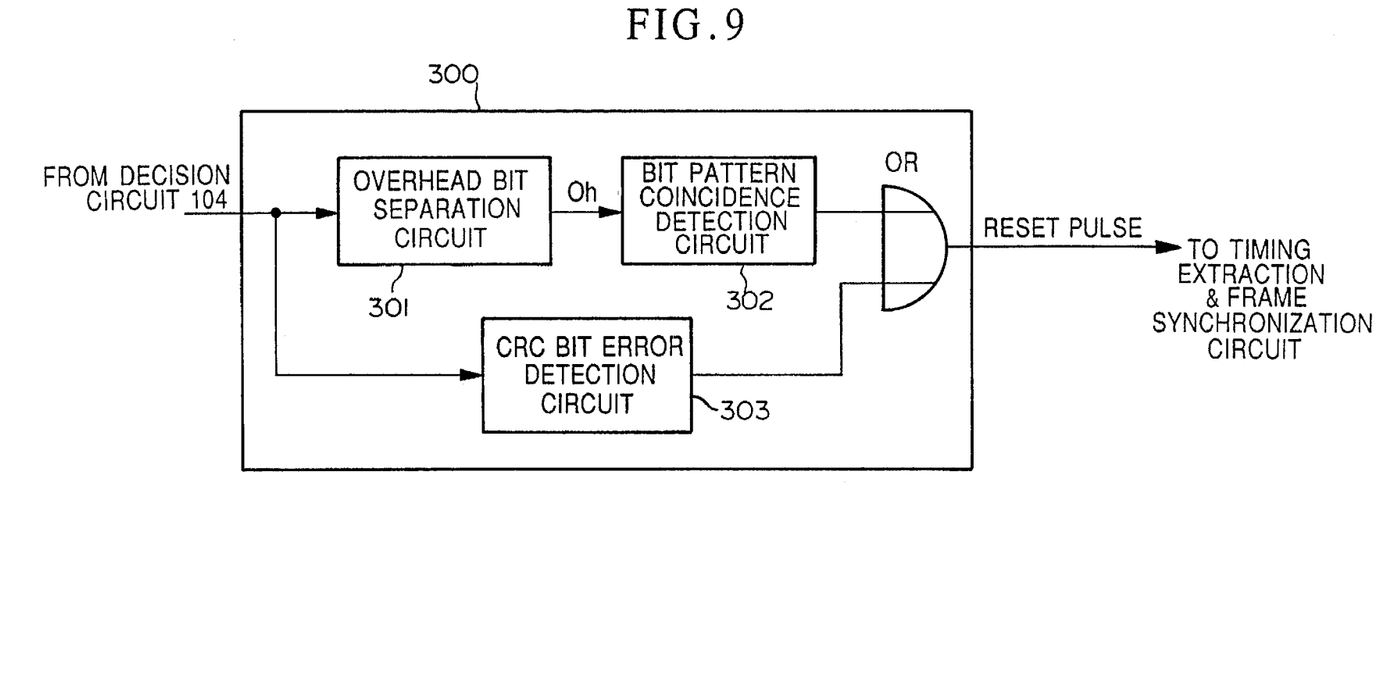
FIG. 9 is a block diagram which shows the other configuration example of the reset circuit 300 for the timing extraction and frame synchronization circuit which is shown in FIG. 2.

FIG. 9 shows one such example. When shown in this figure, a reset pulse is sent out to the timing extraction and frame synchronization circuit 103 according to a logical addition of the reset pulse sending-out condition when using the overhead bit Oh and the other one when using CRC inspection bit CRC, which are respectively described above. Therefore, in this case, the missynchronization probability can be further reduced than by using either the overhead bit Oh or the CRC inspection bit CRC alone.

Furthermore, another method is possible in which a certain sending data can be used as supplementary information for the frame synchronization. In a typical process of the frame synchronization establishment before communication begins, some fixed pattern, e.g., all "0", all "1", etc., are generally sent out as sending data. The detection of such bit patterns and the reset of the timing extraction and frame synchronization circuit 103 in the case of detecting a discrepancy are carried out, whereby the probability of receiving the following original receiving signal becomes high to avoid missynchronization as in the case of using the overhead bit Oh or the CRC inspection bit CRC. In this case, it is not always necessary to use all of the sending data, and only a part of the sending data may be used. It is also possible to combine the method of using sending data as supplementary information for the frame synchronization with both or either of the method of using the overhead bit Oh and the method of using the CRC inspection bit CRC as in the configuration in the example in FIG. 9.

Figure 10:
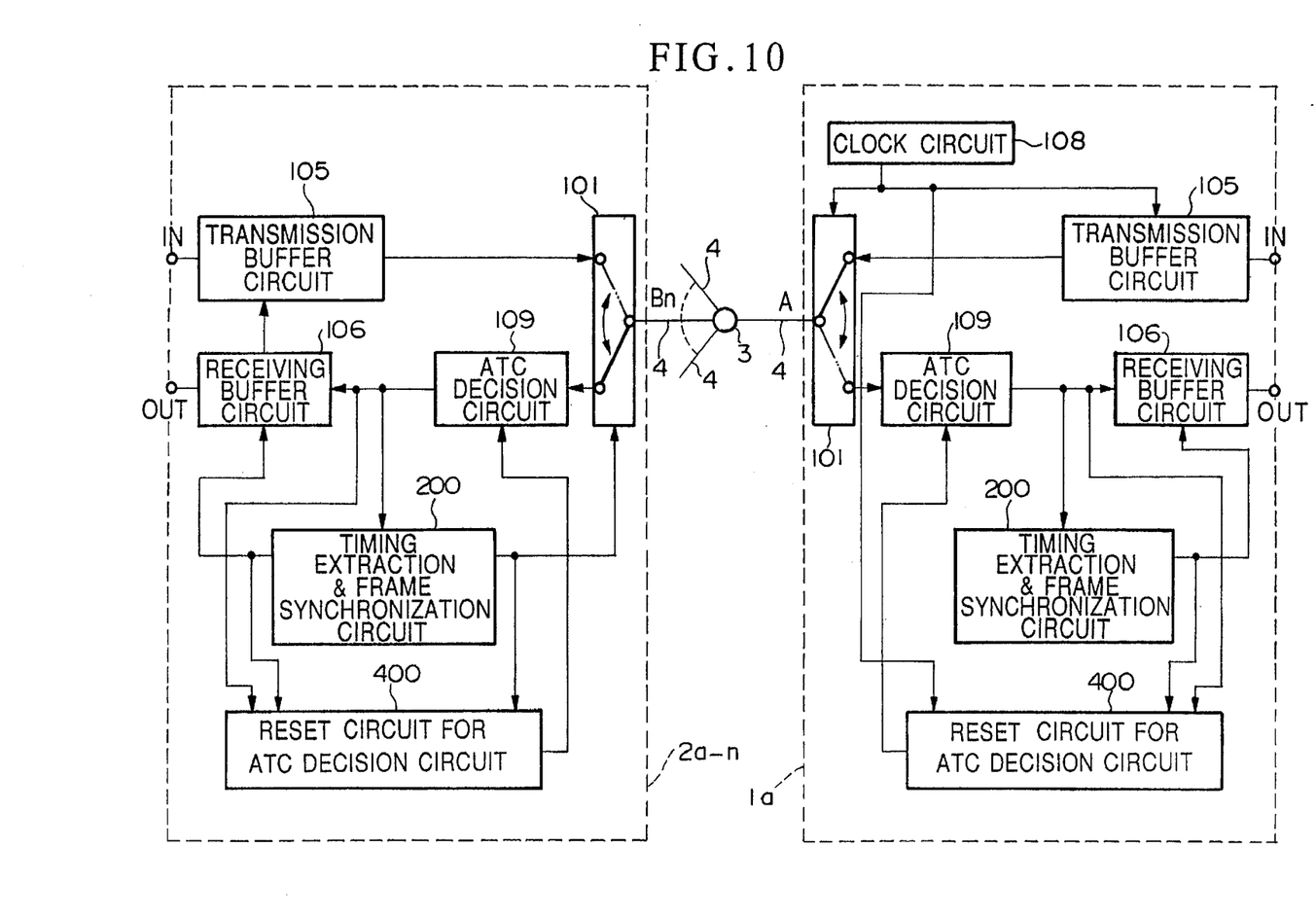
FIG. 10 is a block diagram which shows a configuration of the optical time compression multiplexing transmission system according to another embodiment of the present invention.

Next, another embodiment according to the present invention will be explained, referring to FIG. 10. FIG. 10 is a block schematic diagram of an optical time compression multiplexing transmission system, using identical reference signs for the parts which correspond to those in FIG. 2, and explanation of these parts which have been described above will be omitted.

The system which is shown in FIG. 10 comprises equipment at a central office 1a and equipment at subscriber premises 2a–n. One significant difference between the system in FIG. 10 and that of FIG. 2 is that an ATC (automatic threshold-level control) decision circuit 109 is provided in each piece of equipment in FIG. 10 instead of the automatic gain control amplifier 102 and the decision circuit 104 in FIG. 2. The ATC decision circuit 109 is a circuit which determines the level of receiving signals while automatically adjusting the threshold, which is a decision level, to an appropriate level. This ATC decision circuit 109 is comprised of a circuit which changes the receiving optical signal which is sent from transmission line 4 into an electrical signal, a circuit which changes the signal which was changed into the electrical signal into binary data by comparing it to a fixed threshold value, i.e., a decision level, a circuit which adjusts this threshold value according to the amplitude of the electrical signal, and so on. Moreover, when the ATC decision circuit 109 is reset by the reset signal which is outputted from the reset circuit 400 for the ATC decision circuit, it resets the decision level to a minimum.

What is claimed is:

1. A time division multiplexing point-to-multi-point optical time compression multiplexing transmission system providing time division multiplexing bidirectional 1:n transmission, n being a natural number, between equipment at a central office and n sets of equipment at subscriber premises over single optical fibers, the system, located at either or both of the central office and subscriber premises, comprising:

receiving means for receiving an optical signal and outputting a corresponding receiving signal;

decision means for determining whether said receiving signal from said receiving means is a regular signal; and initialization means for initializing an operation condition of said receiving means when the receiving signal is determined not to be a regular signal by said decision means.

2. A time division multiplexing point-to-multi-point optical time compression multiplexing transmission system according to claim 1, wherein:

said receiving means comprises an automatic gain control amplifier for adjusting its own gain according to an input level of the received optical signal and which maintains an amplitude of a received signal to be outputted at a fixed level;

said decision means determines that the receiving signal outputted from said receiving means is not a regular signal when the receiving signal continues for a fixed period at a logic low level; and said initialization means initializes the gain of said automatic gain control amplifier to a maximum level when the receiving signal is determined not to be a regular signal by said decision means.

3. A time division multiplexing point-to-multi-point optical time compression multiplexing transmission system according to claim 2, wherein:

said fixed period has a length that corresponds to a guard time between a sending frame and a receiving frame.

4. A time division multiplexing point-to-multi-point optical time compression multiplexing transmission system according to claim 1, wherein:

said receiving means comprises an automatic threshold level control decision circuit which changes the received optical signal into binary data based on a fixed threshold value;

said decision means determines that the receiving signal outputted from said receiving means is not a regular signal when the receiving signal continues for a fixed period at a logic low level; and said initialization means initializes the threshold value of the automatic threshold level control decision circuit to a minimum value when the receiving signal is determined not to be a regular signal by said decision means.

5. A time division multiplexing point-to-multi-point optical time compression multiplexing transmission system according to claim 4, wherein:

said fixed period is of a length that corresponds to a guard time between a sending frame and a receiving frame.

6. A time division multiplexing point-to-multi-point optical time compression multiplexing transmission system according to claim 1, wherein:

said receiving means comprises a frame synchronization circuit which detects a frame pattern and establishes a frame synchronization;

said decision means determines that the receiving signal from said receiving means is not a regular signal when a predetermined signal after the frame pattern, which was detected by said frame synchronization circuit, is not a regular signal; and said initialization means initializes a frame synchronization condition of the frame synchronization circuit of said receiving means when the receiving signal is determined not to be a regular signal by said decision means.

7. A time division multiplexing point-to-multi-point optical time compression multiplexing transmission system according to claim 6, wherein:

said decision means determines that said receiving signal is not a regular signal when detecting a cyclic redundancy check bit error for said receiving signal.

8. A time division multiplexing point-to-multi-point optical time compression multiplexing transmission system according to claim 6, wherein:

said decision means determines that said receiving signal is not a regular signal when a predetermined fixed bit pattern, which was contained in said receiving signal, is not detected.

9. A time division multiplexing point-to-multi-point optical time compression multiplexing transmission system according to claim 2, wherein:

said receiving means further comprises a frame synchronization circuit which establishes frame synchronization by detecting a frame pattern;

said decision means determines that the receiving signal from said receiving means is not a regular signal if a condition occurs, the condition being one of a condition that the receiving signal continues for a fixed period at the logic low level, and a condition that a predetermined given signal after the frame pattern, which was detected by said frame synchronization circuit, is not a regular signal; and said initialization means performs one of initializing the gain of said automatic gain control amplifier to a maximum level when the condition in which the receiving signal continues for the fixed period at the logic low level occurs, and initializing the frame synchronization condition of the frame synchronization circuit of said receiving means when the condition in which the detected predetermined signal after the frame pattern is not regular occurs.

10. A time division multiplexing point-to-multi-point optical time compression multiplexing transmission system according to claim 9, wherein:

said decision means determines that said predetermined signal after the frame pattern, which was detected by said frame synchronization circuit, is not a regular signal when it detects a cyclic redundancy check bit error for said receiving signal.

11. A time division multiplexing point-to-multi-point optical time compression multiplexing transmission system according to claim 9, wherein:

said decision means determines that said predetermined signal after the frame pattern, which was detected by said frame synchronization circuit, is not a regular signal when a fixed bit pattern, which was predetermined to be contained in said receiving signal, is not detected.

12. A time division multiplexing point-to-multi-point optical time compression multiplexing transmission system according to claim 4, wherein:

said receiving means further comprises a frame synchronization circuit which establishes frame synchronization by detecting a frame pattern;

said decision means determines that the receiving signal from said receiving means is not a regular signal when a condition occurs, the condition being one of a condition that the receiving signal continues for a fixed period at the logic low level, and a condition that a predetermined signal after the frame pattern, which was detected by said frame synchronization circuit, is not a regular signal; and said initialization means performs one of initializing the threshold value of the automatic threshold level control decision circuit to a minimum value when the condition in which the receiving signal continues for the fixed period at the logic low level occurs, and initializing the frame synchronization condition of the frame synchronization circuit of said receiving means when the condition in which the detected predetermined signal after the frame pattern is not regular occurs.

13. A time division multiplexing point-to-multi-point optical time compression multiplexing transmission system according to claim 12, wherein:

said decision means determines that said predetermined signal after the frame pattern which was detected by said frame synchronization circuit is not a regular signal when it detects a cyclic redundancy check bit error for said receiving signal.

14. A time division multiplexing point-to-multi-point optical time compression multiplexing transmission system according to claim 12, wherein:

said decision means determines that said predetermined signal after the frame pattern which was detected by said frame synchronization circuit is not a regular signal when a fixed bit pattern which was predetermined to be contained in said receiving signal is not detected.

15. A time division multiplexing point-to-multi-point optical time compression multiplexing transmission system according to one of claims 2, 3, 4, 5, 7, 8, 10, 11, 13 and 14, wherein:

said initialization means operates only during a period from a rearmost part of a sending frame to the beginning of a receiving frame.

* * * * *